US008761765B1

(12) United States Patent
Vargantwar et al.

(10) Patent No.: US 8,761,765 B1
(45) Date of Patent: Jun. 24, 2014

(54) UTILIZING ONE OR MORE SEARCH WINDOWS TO CAPTURE BOTH AN EARLIEST-RECEIVED SIGNAL AND A STRONGEST RECEIVED SIGNAL

(75) Inventors: Sachin R. Vargantwar, Overland Park, KS (US); Manoj Shetty, Overland Park, KS (US); Bhagwan Khanka, Lenexa, KS (US); Deveshkumar N. Rai, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 467 days.

(21) Appl. No.: 12/686,507

(22) Filed: Jan. 13, 2010

(51) Int. Cl.
*H04W 4/00* (2009.01)

(52) U.S. Cl.
USPC .................... 455/434; 455/435.1; 455/435.2; 455/466

(58) Field of Classification Search
USPC ............................ 455/434, 435.1–435.2, 466
See application file for complete search history.

(56) References Cited

U.S. PATENT DOCUMENTS

| | | | |
|---|---|---|---|
| 6,421,369 B1 * | 7/2002 | Iwaskai et al. | 375/130 |
| 6,526,029 B1 | 2/2003 | Zhong | |
| 6,775,252 B1 | 8/2004 | Bayley | |
| 6,831,956 B1 | 12/2004 | Schmidl et al. | |
| 7,072,383 B2 | 7/2006 | Saito et al. | |
| 7,392,045 B2 | 6/2008 | Ben-Eli | |
| 2002/0071403 A1 * | 6/2002 | Crowe et al. | 370/331 |
| 2003/0086512 A1 * | 5/2003 | Rick et al. | 375/343 |
| 2009/0125630 A1 * | 5/2009 | Gogic | 709/227 |
| 2010/0142491 A1 * | 6/2010 | Dubreuille et al. | 370/336 |

* cited by examiner

*Primary Examiner* — Patrick Edouard
*Assistant Examiner* — Matthew Genack

(57) ABSTRACT

Methods and apparatus are provided for a wireless communication device (WCD) to utilize one or more search windows to capture both an earliest-received signal and a strongest received signal. In an embodiment, in a first time period, the WCD detects an arrival time of an earliest-received signal and an arrival time of a strongest received signal in one or more search windows for each of at least one set of signals. The WCD then centers a first search window based on the arrival time of the earliest-received signal and centers a second search window based on the arrival time of the strongest received signal for each of the at least one set of signals. In a second time period, the WCD searches for signals using the first and second search windows.

22 Claims, 7 Drawing Sheets

UTILIZING ONE OR MORE SEARCH WINDOWS TO CAPTURE BOTH AN EARLIEST-RECEIVED SIGNAL AND A STRONGEST RECEIVED SIGNAL

BACKGROUND

Many people use wireless communication devices (WCDs), such as cell phones and personal digital assistants (PDAs), to communicate with cellular wireless networks. These WCDs and networks typically communicate with each other over a radio-frequency (RF) air interface according to a wireless communication protocol such as Code Division Multiple Access (CDMA), perhaps in conformance with one or more industry specifications such as IS-95 and IS-2000. Wireless networks that operate according to these specifications are also referred to as "1xRTT (1x) networks," which stands for "Single Carrier Radio Transmission Technology". These networks (referred to herein as "CDMA networks") typically provide communication services such as voice, Short Message Service (SMS) messaging, and packet-data communication.

Typical CDMA networks include a plurality of base stations, each of which provide one or more wireless coverage areas, such as cells and sectors. As a general matter, sectors are used herein as examples of wireless coverage areas. When a WCD is positioned in a sector, it can communicate over the RF air interface with the base station, and, in turn, over one or more circuit-switched and/or packet-switched signaling and/or transport networks to which the base station provides access. The base station and the WCD conduct these communications over a frequency known as a carrier. Note that base stations may provide service in a sector on one carrier, or on more than one, and further that a given instance of a given carrier in a given sector may be referred to herein as a "sector/carrier."

In general, a pilot channel functions to alert WCDs in a given sector of the presence of a service-providing base station. Typically, the pilot channel conveys a value known as a pseudorandom number (PN) offset, which identifies the sector; in particular, by being offset from CDMA system time by a certain amount of time, the pilot channel conveys the PN offset. WCDs generally use the pilot channel to coherently detect and demodulate the signal on a sector/carrier.

In a typical wireless network, a WCD maintains different base-station-signal sets that typically include an active set, a candidate set, a neighbor set, and a remaining set. At a given time, the active set comprises one or more "active" sectors or coverage areas that are being used to maintain a call for the WCD. The WCD receives substantially the same information from each of the coverage areas in the active set and, on a frame-by-frame basis, selects the best signal to use. The candidate set comprises sectors that are not presently assigned to a call, but are strong enough to be used for a call. The neighbor set comprises sectors having signals that could be received with sufficient strength to enable successful communication. The remaining set comprises sectors the WCD is in communication with that are not in the active, candidate or remaining sets. The WCD, one or more base stations, and/or a base station controller maintains in memory a list of the coverage areas in the WCD's base-station-signal sets.

In existing systems, to facilitate a determination of which sectors should be in the WCD's active and neighbor set, all base stations emit a pilot signal, typically at a power level higher than other forward-link signals. A WCD constantly measures the strength of each pilot that it receives, and notifies at least one base station when pilot strength for various coverage areas falls above or below designated thresholds. The base station, may, in turn, provide the WCD with updated lists of the sectors in the various base-station-signal sets.

In a CDMA system configured as above, a link from the base station to the WCD is called a forward link and a link from the WCD to the base station is called a reverse link. All forward links from a given base station have the same PN offset. The PN offset is transmitted via the pilot signal, as one of the forward-link channels. A WCD continuously monitors the pilot signal in order to obtain a good quality signal on the forward link. A WCD located within the coverage area of the base station uses the pilot signal for synchronization. A WCD can acquire the timing of the CDMA forward-link traffic channel from the pilot signal and obtain the phase reference for coherent demodulation.

OVERVIEW

In current implementations, a base station provides a WCD with a search window to search for pilot signals. A search window is the amount of time, in terms of chips, that a WCD will search for a pilot, where a chip is the unit of code spreading for CDMA (one chip is approximately 0.8 µs in duration). When the WCD is initially connected to the base station, the base station transmits a search-window size to the WCD. A WCD utilizes a single search window (having that search-window size) to detect a signal for each of the various signal sets on a continual basis. Specifically, the WCD detects the arrival time of the earliest-received signal and then re-centers the search window in a subsequent time period based on this arrival time.

The presently disclosed methods and apparatus come, at least in part, from a recognition that conventional methods for detecting signals using a single search window centered based on the arrival time of the earliest-received signal do not optimize the probability of also detecting the strongest signal. For example, the strongest signal may occur earlier or later in time than the earliest-received signal and may therefore fall outside the single search window.

To address the limitations of a conventional single search window centered based on the arrival time of the earliest-received signal, disclosed herein are methods and apparatus for utilizing one or more search windows to capture both the earliest-received signal and a strongest received signal. For example, a first search window may be centered based on the arrival time of the earliest-received signal and a second search window may be centered based on the arrival time of the strongest received signal. Alternatively, a single search window may be centered based on a midpoint between the arrival times of the earliest-received signal and the strongest received signal. And other implementations are disclosed and contemplated as well. In general, detecting and tracking both the earliest-received signal and the strongest received signal serves to enhance the signal quality on the forward link channel.

BRIEF DESCRIPTION OF DRAWINGS

Various exemplary embodiments are described herein with reference to the following drawings, wherein like numerals denote like entities.

DETAILED DESCRIPTION OF EXEMPLARY EMBODIMENTS

1. Exemplary Architecture

Figure 1:
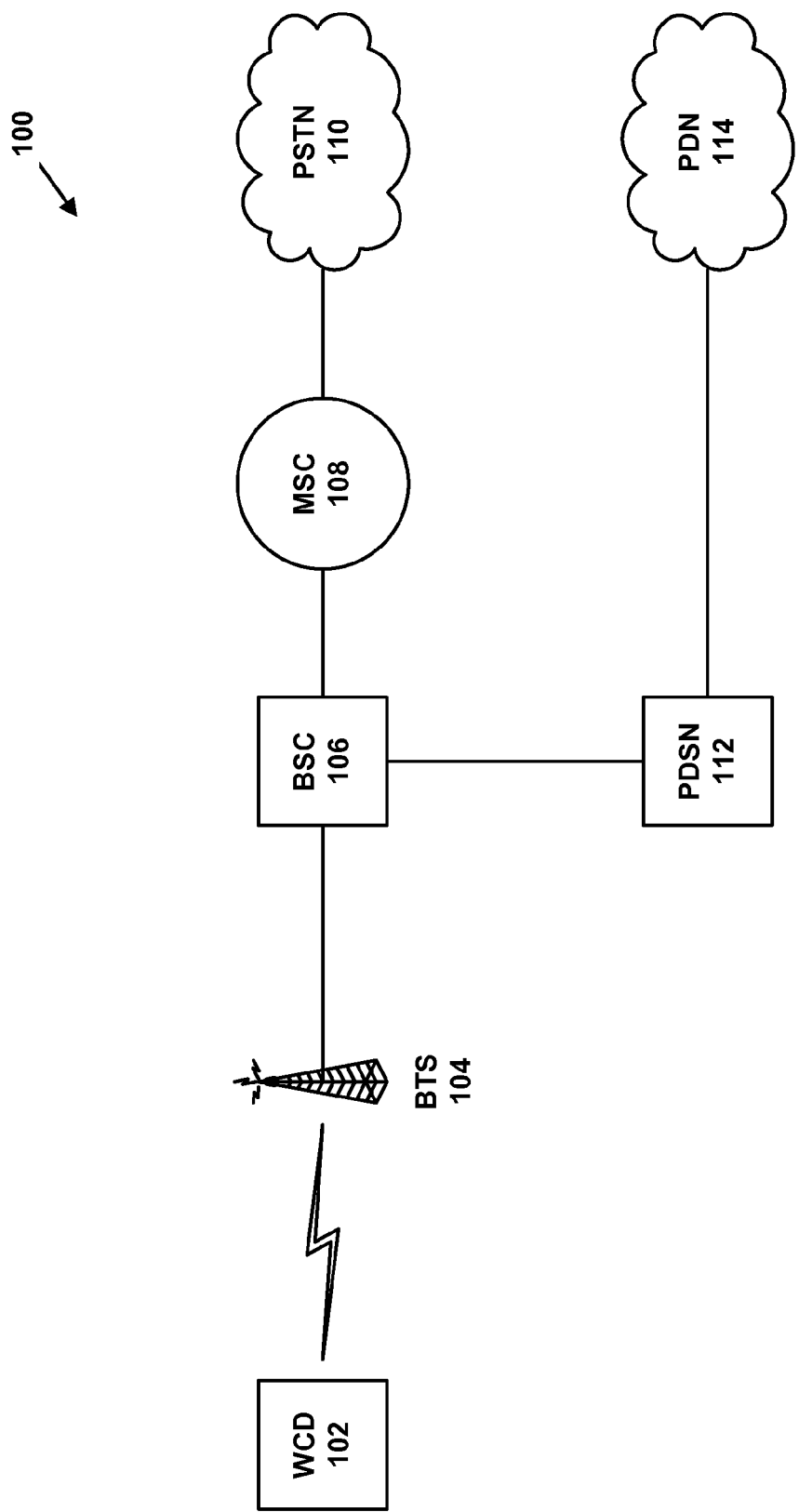
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a wireless communication device (WCD) 102, a base transceiver station (BTS) 104, a base station controller (BSC) 106, a mobile switching center (MSC) 108, a public switched telephone network (PSTN) 110, a packet data serving node (PDSN) 112, and a packet-data network (PDN) 114. And additional entities could be present, such as additional mobile stations in communication with BTS 104, additional BTSs in communication with BSC 106, and additional BSCs in communication with MSC 108, etc.; furthermore, there could be additional entities in communication with PSTN 110 and/or PDN 114. Also, there could be one or more devices and/or networks making up at least part of one or more of the communication links. For example, there could be one or more routers, switches, or other devices or networks on the link between PDSN 112 and PDN 114. And PSTN 110 and PDN 114 may be connected via one or more gateways and/or other devices. And other variations and/or additions are possible as well.

WCD 102 may be any mobile device arranged to carry out the mobile-station functions described herein. As such, WCD 102 may include a user interface, a wireless-communication interface, a processor, and data storage comprising instructions executable by the processor for carrying out those WCD functions. The user interface may include buttons, a touchscreen, a microphone, and/or any other elements for receiving inputs, as well as a speaker, one or more displays, and/or any other elements for communicating outputs.

The wireless-communication interface may comprise an antenna and a chipset for communicating with one or more base stations over an air interface. As an example, the chipset could be one that is suitable for CDMA communication. The chipset or wireless-communication interface in general may also be able to communicate with other types of networks and devices, such as IS-856 Evolution Data Optimized (EV-DO) networks, Wi-Fi (IEEE 802.11) networks, Bluetooth devices, and/or one or more additional types of wireless networks. The processor and data storage may be any suitable components known to those of skill in the art. As examples, WCD 102 could be or include a cell phone, a PDA, a computer, a laptop computer, a hybrid CDMA/EV-DO device, and/or a multi-mode cellular/Wi-Fi device.

Note that the combination of BTS 104 and BSC 106 may be considered—and referred to herein as—a base station. However, BTS 104 or BSC 106 could, taken alone, be considered a base station as well. Furthermore, a base station may be considered to be either or both of those devices, and perhaps make use of one or more functions provided by MSC 108, PDSN 112, and/or any other entity.

BTS 104 may be any network element arranged to carry out the BTS functions described herein. As such, BTS 104 may include a communication interface, a processor, and data storage comprising instructions executable by the processor to carry out those BTS functions. The communication interface may include one or more antennas, chipsets, and/or other components for providing one or more CDMA (and/or other protocol) coverage areas such as cells and sectors, for communicating with WCDs, such as WCD 102, over an air interface. The communication interface may also include one or more wired and/or wireless interfaces for communicating with at least BSC 106. As an example, a wired Ethernet interface may be included.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least BTS 104, MSC 108, and PDSN 112. In general, BSC 106 functions to control one or more BTSs such as BTS 104, and to provide one or more BTSs such as BTS 104 with connections to devices such as MSC 108 and PDSN 112.

MSC 108 may be any networking element arranged to carry out the MSC functions described herein. As such, MSC 108 may include a communication interface, a processor, and data storage comprising instructions executable by the processor to carry out those MSC functions. The communication interface may include one or more wired and/or wireless interfaces for communicating with at least BSC 106 and PSTN 110. In general, MSC 108 functions as a switching element between PSTN 110 and one or more BSCs such as BSC 106, facilitating communication between WCDs and PSTN 110, which may be the well-known public switched telephone network.

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and PDN 114. In general, PDSN 112 functions as a network access server between PDN 114 and BSCs such as BSC 106, facilitating packet-data communication between WCDs and PDN 114.

PDN 114 may include one or more wide area networks, one or more local area networks, one or more public networks such as the Internet, one or more private networks, one or more wired networks, one or more wireless networks, and/or one or more networks of any other type. Devices in communication with PDN 114 may exchange data using a packet-switched protocol such as the Internet Protocol (IP), and may be identified by an address such as an IP address.

2. Exemplary Operation

Figure 2:
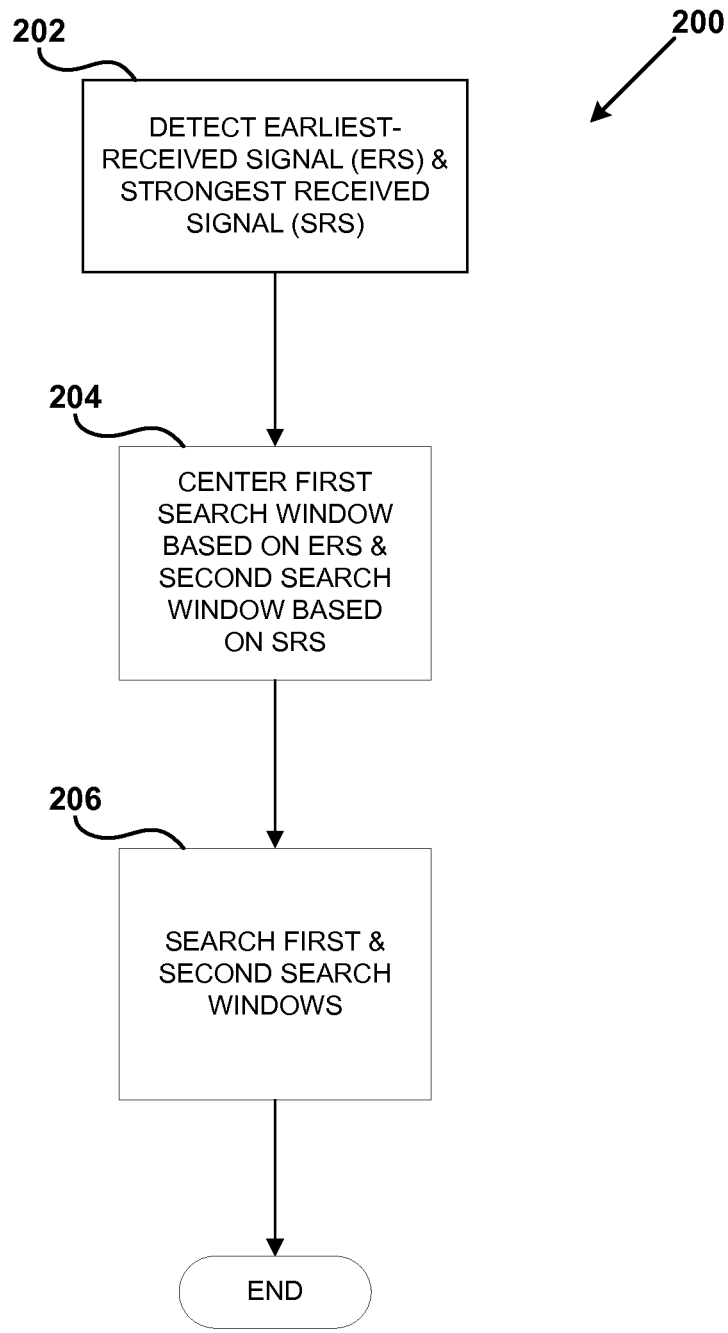
FIG. 2 is a flowchart of a method, in accordance with exemplary embodiments.

FIG. 2 depicts a flowchart of method 200 for utilizing one or more search windows to capture both an earliest-received signal and a strongest received signal, in accordance with exemplary embodiments. As shown in FIG. 2, method 200 begins at step 202, where in a first time period, the WCD 102 detects an arrival time of an earliest-received signal and an arrival time of a strongest received signal in one or more search windows for each of at least one set of signals. At step 204, the WCD 102 centers a first search window based on the arrival time of the earliest-received signal and centers a second search window based on the arrival time of the strongest received signal for each of the at least one set of signals. In a second time period, at step 206, the WCD 102 searches for signals using the first and second search windows.

In CDMA networks, data is transmitted from the BTS 104 to the MS 102 (and vice versa) in data units that are known as frames, which typically last 20 ms. And method 200 is preferably carried out repeatedly on a periodic basis, for example in each of a plurality of successive frames, so as to dynamically and iteratively re-center the first and second search windows based on the changing arrival times of the earliest-received signal and strongest received signal in each time period.

Figure 3:
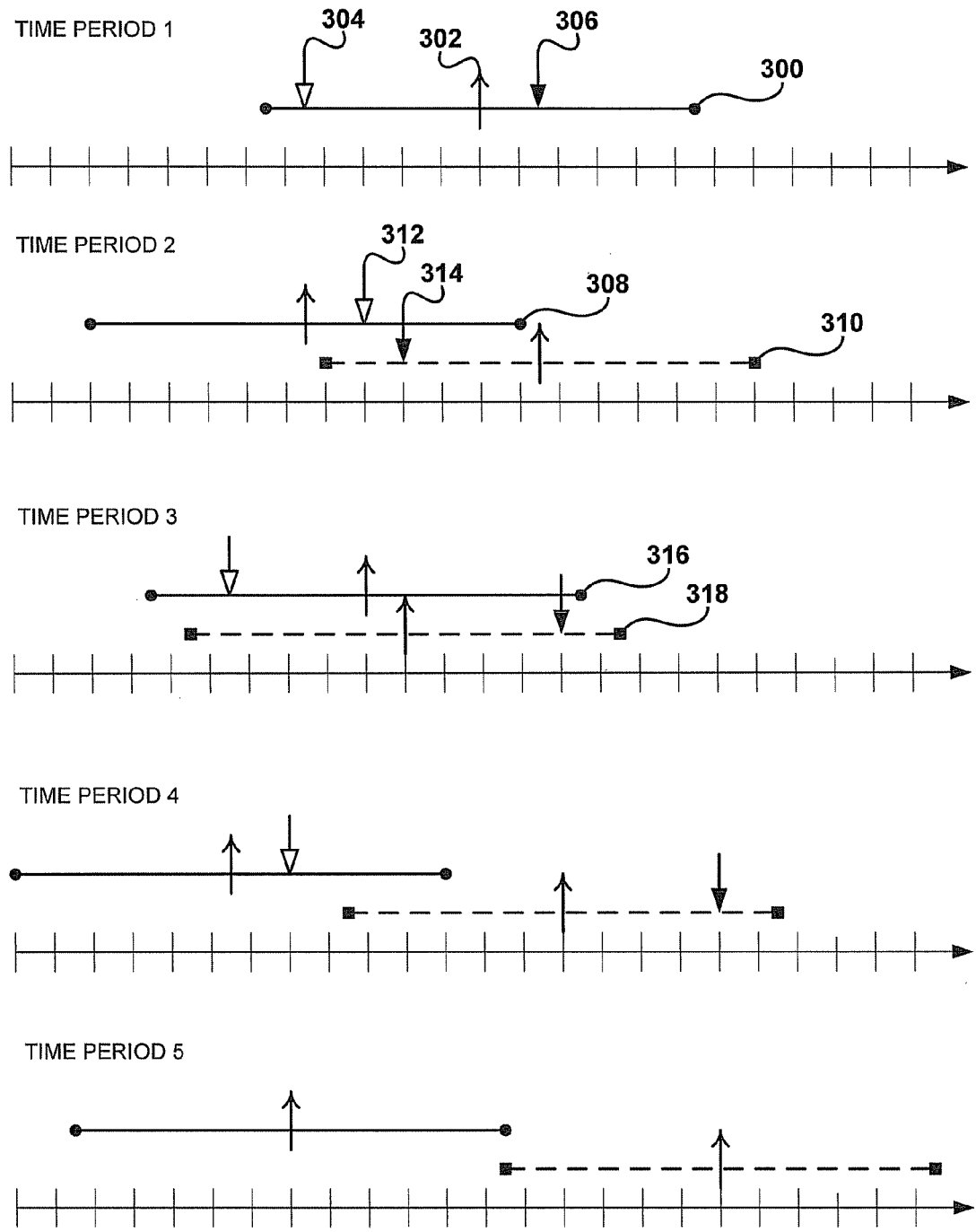
FIG. 3 is a series of time periods illustrating one or more search windows centered based on arrival times of an earliest-received signal and a strongest received signal.

An example of method 200 being periodically repeated is shown in FIG. 3. In time period 1, a search window 300 having a center 302 detects the arrival time 304 of the earliest-received signal and the arrival time 306 of the strongest received signal. In time period 2, the WCD 102 centers the first search window 308 based on the arrival time 304 of the earliest-received signal in time period 1 and centers the second search window 310 based on the arrival time 306 of the strongest received signal in time period 1. The WCD 102 then searches for signals using the first and second search windows 308, 310. In time period 3, the WCD 102 centers the first search window 316 based on the arrival time 312 of the earliest received signal in time period 2 and centers the second search window 318 based on the arrival time 314 of the strongest received signal. The WCD 102 then searches for signals using the first and second search windows 316, 318. And, for the purpose of illustration, method 200 is similarly repeated in time periods 4 and 5.

Figure 4:
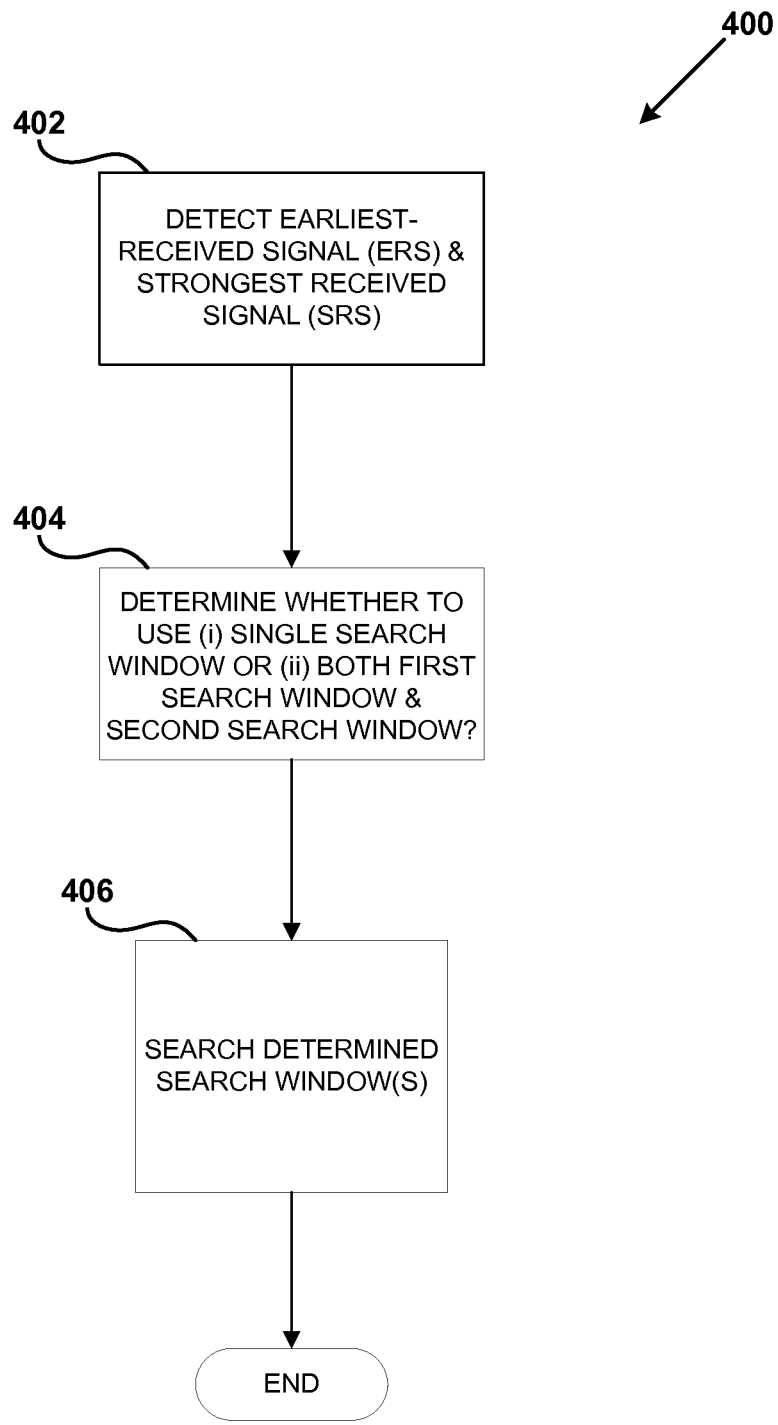
FIG. 4 is a flowchart of a method, in accordance with exemplary embodiments.

FIG. 4 depicts a flowchart of a second method 400 for utilizing one or more search windows to capture both an earliest-received signal and a strongest received signal, in accordance with exemplary embodiments. As shown in FIG. 4, method 400 begins at step 402, where in a first time period, the WCD 102 detects an arrival time of an earliest-received signal and an arrival time of a strongest received signal in one or more search windows for each of at least one set of signals. At step 404, the WCD 102 uses the arrival time of the earliest-received signal and the arrival time of the strongest received signal to determine, for each of the at least one set of signals, whether to utilize (i) a single search window or (ii) both a first search window and a second search window. At step 406, in a second time period, the WCD 102 searches for signals using the determined (i) single search window or (ii) first and second search windows.

Figure 5:
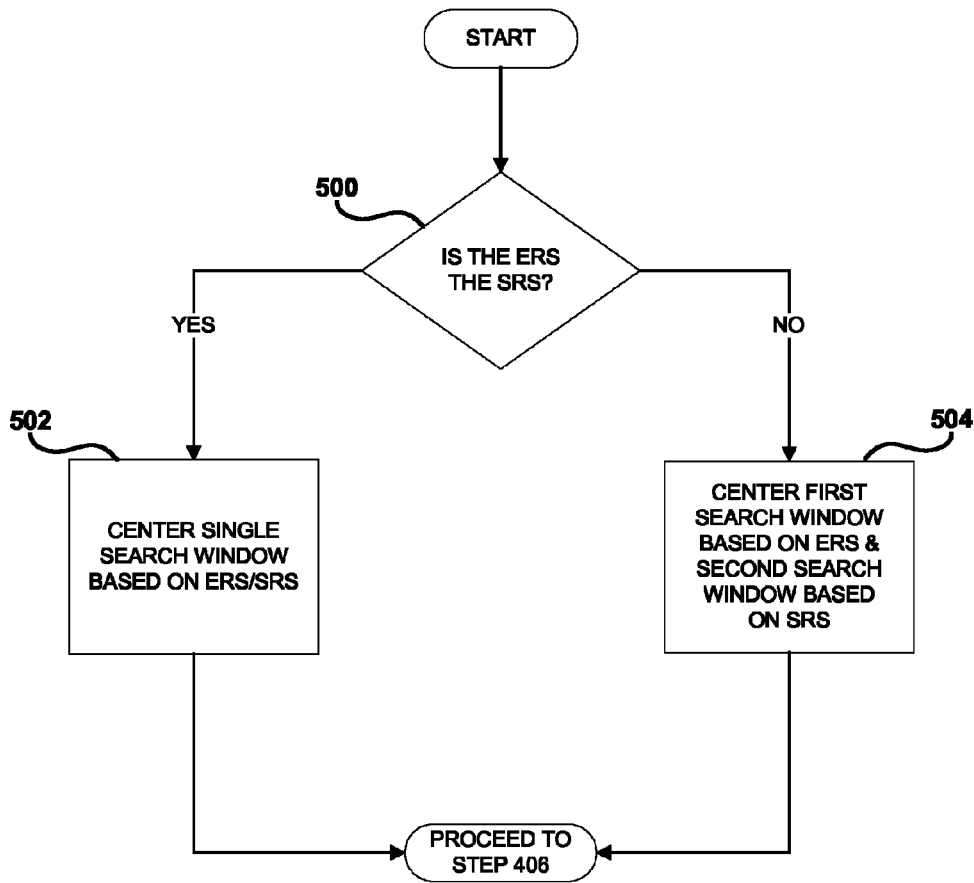
FIG. 5 is a flow chart depicting a function that can be carried out in accordance with an embodiment of the invention.
Figure 6:
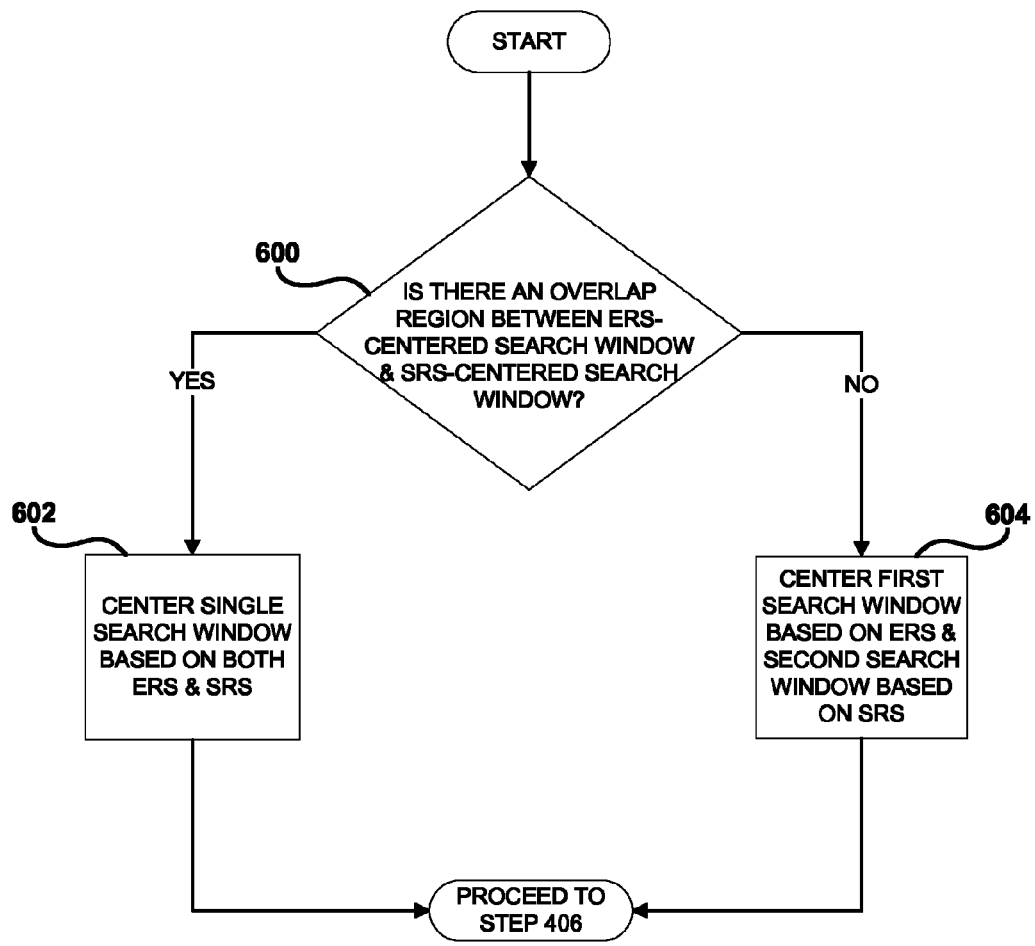
FIG. 6 is a flow chart depicting a function that can be carried out in accordance with an embodiment of the invention.

FIGS. 5-6 are flowcharts depicting a set of functions that can be carried out in accordance with various embodiments. Generally, FIGS. 5-6 depict different embodiments of the WCD 102 carrying out step 404 of FIG. 4.

As shown in the embodiment of FIG. 5, the WCD 102 determines (at 500) whether the earliest received signal is the strongest received signal. If the earliest-received signal is the strongest received signal, then the WCD 102 (at 502) utilizes a single search window, where the single search window is centered based on the arrival time of the earliest-received signal. And if the earliest-received signal is not the strongest received signal, then the WCD 102 (at 504) utilizes both a first search window and a second search window, where the first search window is centered based on the arrival time of the earliest-received signal and the second search window is centered based on the arrival time of the strongest received signal.

FIG. 6 depicts an embodiment where the WCD 102 determines (at 600) whether the first search window and the second search window have an overlap region. If the first search window and the second search window have an overlap region, then the WCD 102 (at 602) utilizes a single search window, where the single search window is centered based on a midpoint between the arrival times of the earliest-received signal and the strongest received signal. Alternatively, if the first search window and the second search window do not have an overlap region, then the WCD 102 (at 604) utilizes both a first search window and a second search window, where the first search window is centered based on the arrival time of the earliest-received signal and the second search window is centered based on the arrival time of the strongest received signal.

Figure 7:
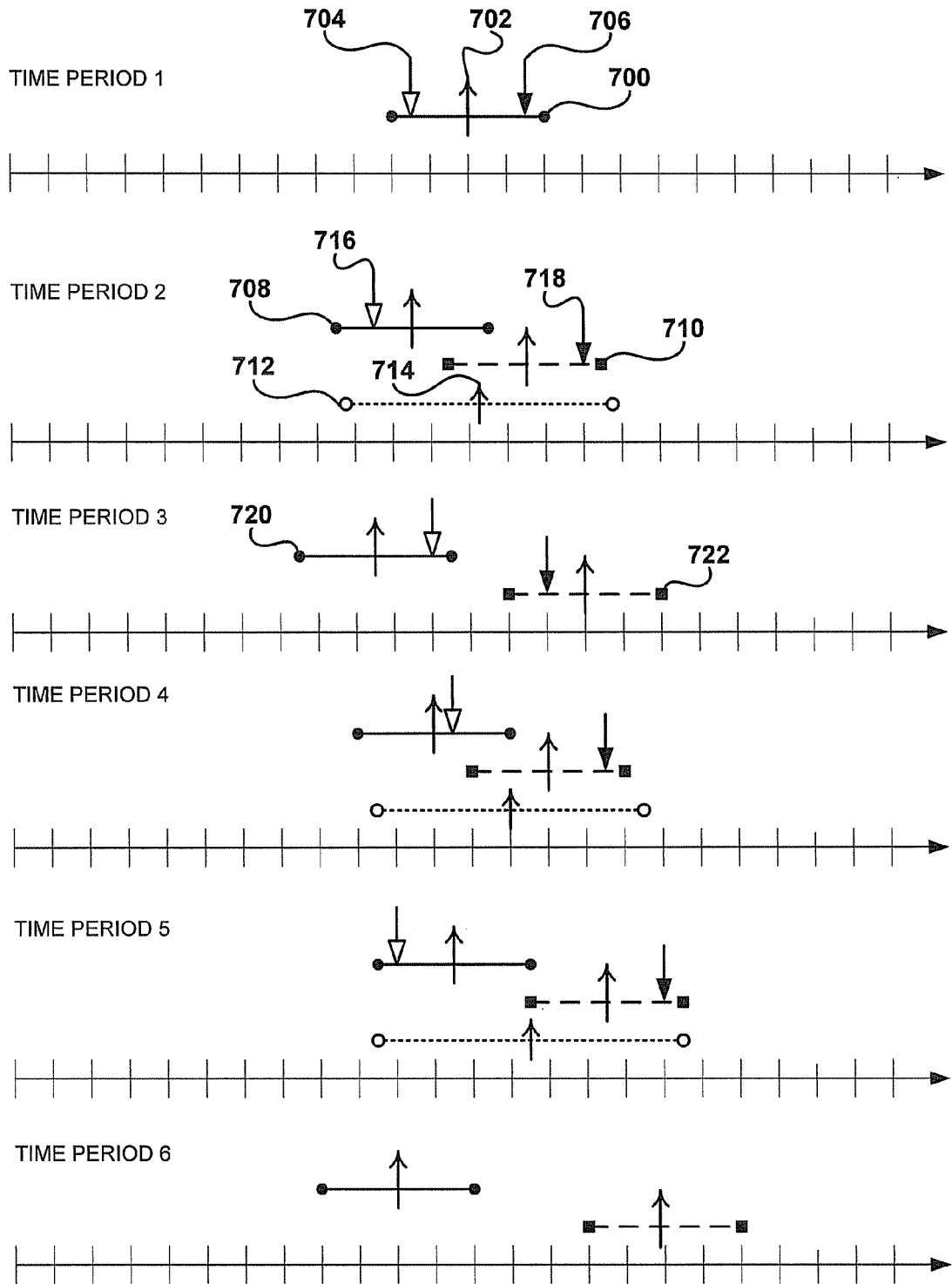
FIG. 7 is a series of time periods illustrating one or more search windows centered based on arrival times of an earliest-received signal and a strongest received signal.

Like method 200, method 400 is also preferably carried out repeatedly on a periodic basis. As such, FIG. 7 shows the WCD 102 repeating method 400 in each of a plurality of time periods. As shown in FIG. 7, in time period 1, a search window 700 having a center 702 detects the arrival time 704 of the earliest-received signal and the arrival time 706 of the strongest received signal. The WCD 102 determines that the first search window 708 (centered at 704) and the second search window 710 (centered at 706) have an overlap region, which is shown simply for illustrative purposes in time period 2. Accordingly, the WCD utilizes the single search window 712, where the single search window 712 is centered based on a midpoint 714 between the arrival times 704 and 706 of the earliest-received signal and the strongest received signal, respectively. In time period 2, the WCD 102 then searches for signals using the single search window 712.

After detecting the respective arrival times 716 and 718 of the earliest-received signal and strongest received signal at time period 2, the WCD 102 determines that the first search window 720 and the second search window 722 do not have an overlap region. As such, at time period 3, the WCD 102 centers the first search window 720 based on the arrival time 716 of the earliest received signal and centers the second search window 722 based on the arrival time 718 of the strongest received signal in time period 2. In time period 3, the WCD 102 then searches for signals using the first and second search windows 720, 722. And, for the purpose of illustration, method 400 is similarly performed for time periods 4 to 6.

Note that the single search window, the first search window, and the second search window may each have a default search-window size, preferably in the range of 20-100 chips, and the default search-window size may be the same or different for each of the search windows. The size of a single search window may be the sum of the default search-window size for the first search window and the second search window minus the overlap region. Still further, where the first search window and second search window do not have an overlap region but abut one another (FIG. 7, in time period 5), either the single search window or the first and second search windows may be utilized based on the preferred settings for the WCD 102.

Each of the foregoing methods and embodiments may be carried out for at least one set of signals including the active set, the candidate set, the neighbor set, and the remaining set.

3. Conclusion

Various exemplary embodiments have been described above. Those skilled in the art will understand, however, that changes and modifications may be made to those examples without departing from the scope of the claims.

We claim:

1. A method for a wireless communication device (WCD) to utilize one or more search windows to capture both an earliest-received signal and a strongest received signal, the method comprising:

the WCD detecting an arrival time of an earliest-received signal and an arrival time of a strongest received signal in one or more search windows for each of at least one set of signals;

after the detection of the earliest-received signal's arrival time and the strongest received signal's arrival time, the WCD centering a first search window based on the detected arrival time of the earliest-received signal and centering a second search window based on the detected arrival time of the strongest received signal for each of the at least one set of signals; and after the centering of the first search window and the second search window, the WCD searching for signals using both the centered first search window and the centered second search window during a same frame.

2. The method of claim 1, wherein the at least one set of signals comprises a neighbor set.

3. The method of claim 1, wherein the at least one set of signals comprises an active set.

4. The method of claim 3, wherein the at least one set of signals further comprises a neighbor set.

5. The method of claim 1, further comprising repeating the detecting, centering, and searching steps for each of a plurality of successive time periods.

6. The method of claim 5, wherein the time periods are frames.

7. The method of claim 1, wherein the first search window and the second search window each have a default search-window size.

8. The method of claim 7, wherein the default search-window size is the same for the first search window and the second search window.

9. The method of claim 7, wherein the default search-window size is in the range of 20-100 chips.

10. A method for a WCD to utilize one or more search windows to capture an earliest-received signal and a strongest received signal, the method comprising:

the WCD detecting an arrival time of an earliest-received signal and an arrival time of a strongest received signal in one or more search windows for each of at least one set of signals; and after the detection of the earliest-received signal's arrival time and the strongest received signal's arrival time, the WCD using the detected arrival time of the earliest-received signal and the detected arrival time of the strongest received signal to determine, for each of the at least one set of signals, whether to utilize (i) a single search window or (ii) both a first search window and a second search window; and after determining whether to utilize (i) a single search window or (ii) both a first search window and a second search window, the WCD searching for signals using the determined (i) single search window or (ii) first and second search windows during a single frame.

11. The method of claim 10, wherein the at least one set of signals comprises a neighbor set.

12. The method of claim 10, wherein the at least one set of signals comprises an active set.

13. The method of claim 12, wherein the at least one set of signals further comprises a neighbor set.

14. The method of claim 10, further comprising the WCD repeating the detecting and determining steps for each of a plurality of time periods subsequent to the first and second time periods.

15. The method of claim 14, wherein the first time period comprises a first frame, wherein the second time period comprises a second frame, and wherein the plurality of time periods comprises a plurality of frames.

16. The method of claim 10, wherein the WCD using respective arrival times of the earliest-received signal and the strongest received signal to determine, for each of the at least one set of signals, whether to utilize (i) a single search window or (ii) both a first search window and a second search window comprises:

determining whether the first search window and the second search window have an overlap region;

if the first search window and the second search window have an overlap region, then utilizing a single search window, the single search window being centered based on a midpoint between the arrival times of the earliest-received signal and the strongest received signal; and if the first search window and the second search window do not have an overlap region, then utilizing both a first search window and a second search window, the first search window being centered based on the arrival time of the earliest-received signal and the second search window being centered based on the arrival time of the strongest received signal.

17. The method of claim 16, wherein the size of the single search window is the sum of a default size for the first search window and a default size for the second search window minus the overlap region.

18. The method of claim 10, wherein the WCD using respective arrival times of the earliest-received signal and the strongest received signal to determine, for each of the at least one set of signals, whether to utilize (i) a single search window or (ii) both a first search window and a second search window comprises:

determining whether the earliest received signal is the strongest received signal;

if the earliest-received signal is the strongest received signal, then utilizing a single search window, the single search window being centered based on the arrival time of the earliest-received signal; and if the earliest-received signal is not the strongest received signal, then utilizing both a first search window and a second search window, the first search window being centered based on the arrival time of the earliest-received signal and the second search window being centered based on the arrival time of the strongest received signal.

19. The method of claim 10, wherein each search window has a respective default search-window size.

20. The method of claim 10, wherein the default search-window size is in the range of 20-100 chips.

21. The method of claim 10, carried out by a WCD comprising:
- a wireless-communication interface;
- a processor; and
- data storage containing program instructions executable by the processor.

22. A WCD capable of utilizing one or more search windows to capture both an earliest-received signal and a strongest received signal, the apparatus comprising:
- a wireless-communication interface;
- a processor; and
- data storage containing program instructions executable by the processor for:
  - detecting an arrival time of an earliest-received signal and an arrival time of a strongest received signal in one or more search windows for each of at least one set of signals;
  - after the detection of the earliest-received signal's arrival time and the strongest received signal's arrival time, centering a first search window based on the detected arrival time of the earliest-received signal and centering a second search window based on the detected arrival time of the strongest received signal for each of the at least one set of signals; and
  - after centering of the first search window and the second search window, searching for signals using both the centered first search window and the centered second search window during a same frame.

* * * * *